Jan. 13, 1959     C. E. MILLER     2,868,032
INDEXING MECHANISM
Filed Feb. 12, 1954             2 Sheets-Sheet 1
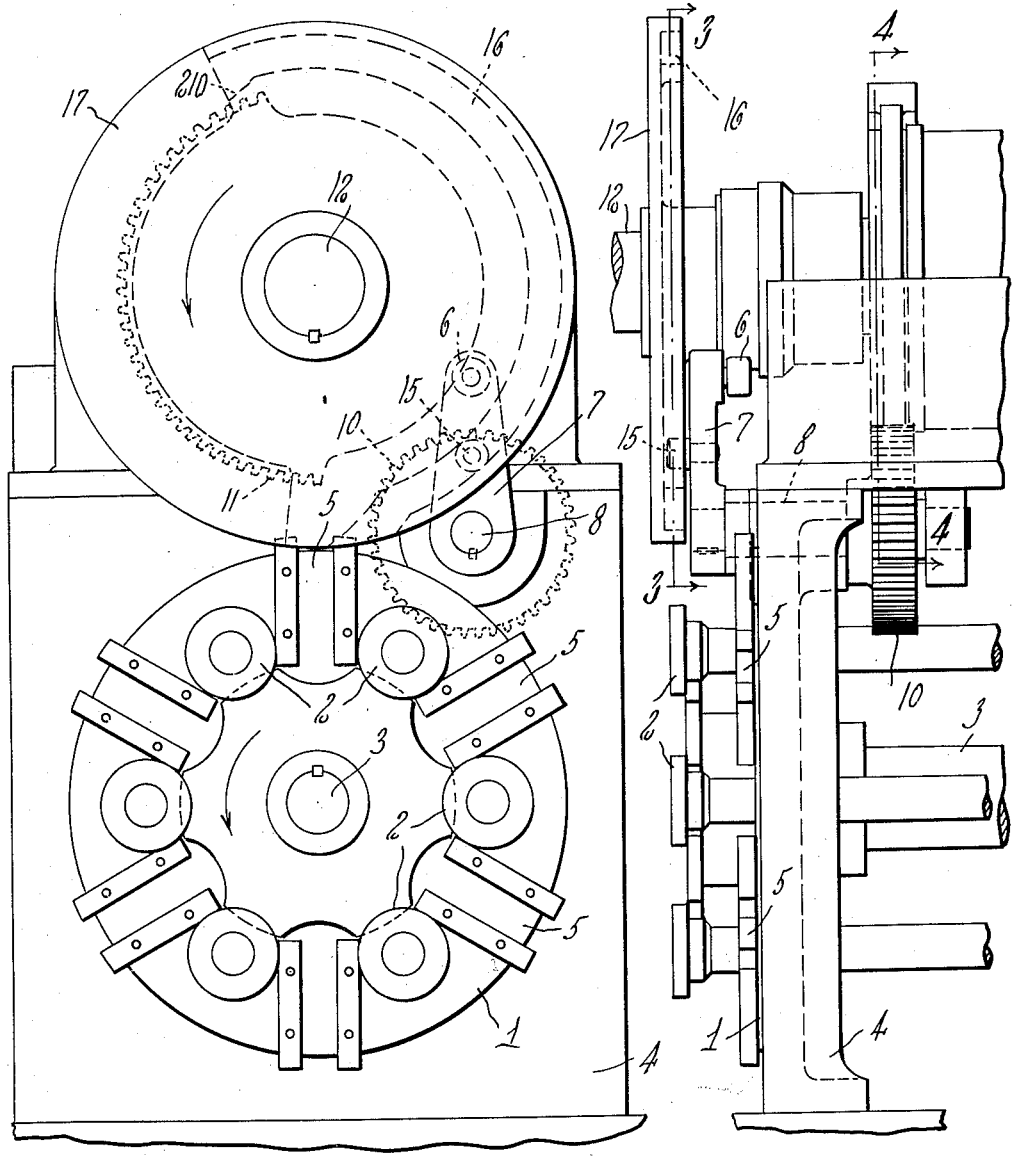

Jan. 13, 1959 C. E. MILLER 2,868,032
INDEXING MECHANISM
Filed Feb. 12, 1954 2 Sheets-Sheet 2
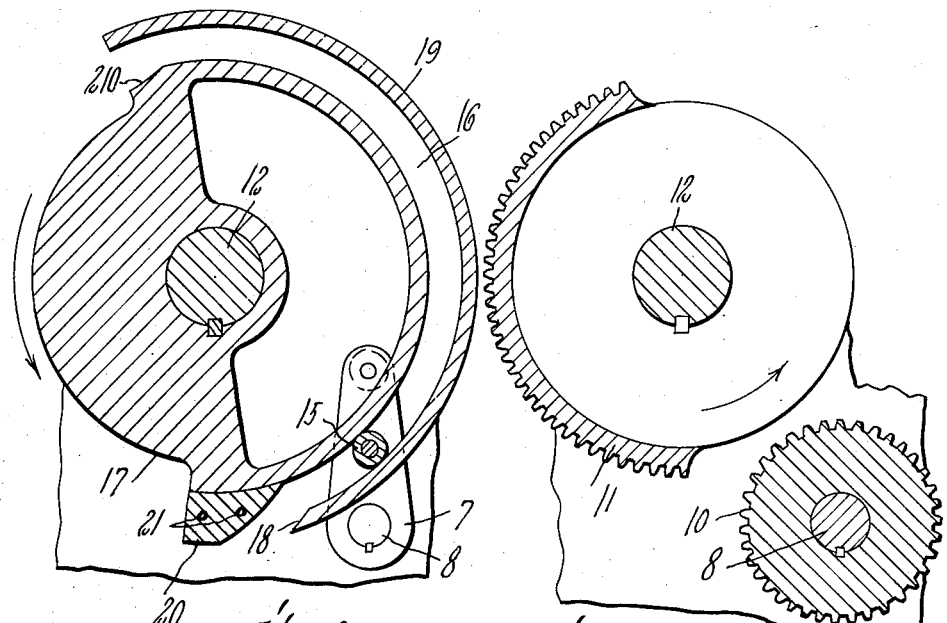
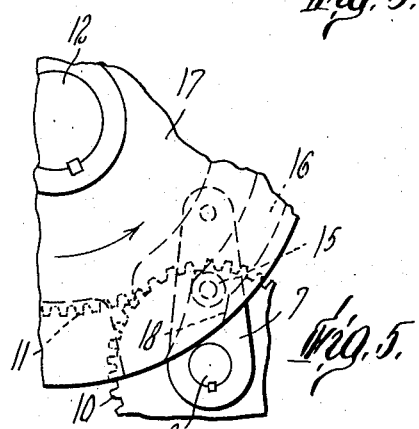
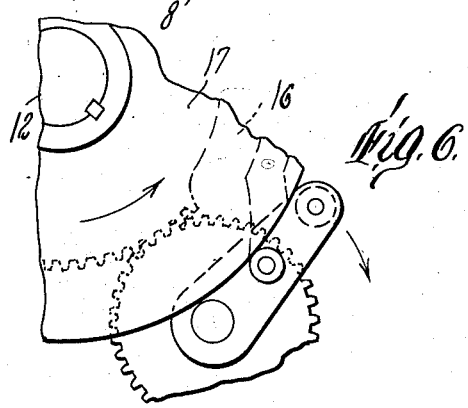
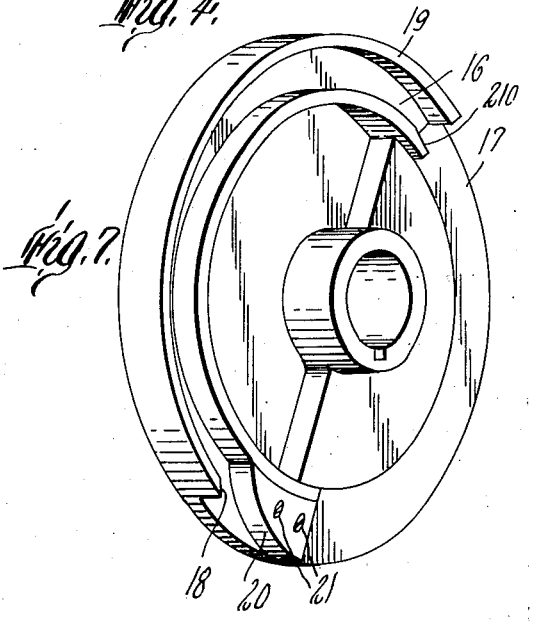
Inventor
Carroll E. Miller United States Patent Office 2,868,032
Patented Jan. 13, 1959

2,868,032

INDEXING MECHANISM

Carroll E. Miller, Windsor, Vt., assignor to Cone Automatic Machine Company Inc., Windsor, Vt., a corporation of Vermont Application February 12, 1954, Serial No. 409,816

1 Claim. (Cl. 74—436)

This invention relates to indexing mechanism and has been designed more particularly for indexing the spindle-carrying drum of a multiple spindle lathe, or the like, though it is not limited to such use.

It has for an object to provide for an intermittently operable indexing mechanism which will operate quietly and without shock or jar.

To these ends an indexing arm is provided which is carried by an intermittently rotated shaft, this arm and shaft being held stationary between indexing actions and positively driven when indexing is about to be and is being effected.

For a complete understanding of this invention, reference may be had to the accompanying drawings in which—

Figure 1 is a fragmentary end elevation of a multiple spindle lathe embodying the invention.

Figure 2 is a fragmentary front elevation of the same.

Figures 3 and 4 are detail sectional views on lines 3—3 and 4—4, respectively, of Figure 2.

Figures 5 and 6 are fragmentary views similar to a portion of Figure 1, but showing the parts in successive positions during an indexing portion of the cycle.

Figure 7 is a perspective view of the controlling cam for the indexing arm.

Referring first to Figures 1 and 2, at 1 is shown a member to be indexed, and as shown this member is a carrier for a plurality of rotary spindles 2 arranged in circular array about the central axis of rotation 3 of the carrier. This carrier may be journaled for rotation in a suitable frame 4 which may be a wall member of a multiple spindle lathe.

The member 1 carries a plurality of ways 5, each radiating from the central axis 3 and forming guideways for the reception of a follower 6 carried by an indexing arm 7 secured to a jack shaft 8 and rotatable in a single plane. This jack shaft is mounted for rotation parallel to the axis of the carrier 1 and by rotation of this jack shaft it will be seen that the follower 6 is caused to engage the ways 5 successively and to turn the member 1 at each rotation of the jack shaft through a predetermined angular distance to bring the several spindles 2 successively into each of the various indexed angular positions.

The jack shaft 8, as shown best in Figures 1, 2 and 4, has secured thereto a pinion 10 rotatable in a single plane which may be engaged at suitable times by a gear segment 11 on a drive shaft 12. During the time of engagement between the segment 11 and the pinion 10 and as the drive shaft 12 is rotated, the pinion is given one complete rotation and produces a single indexing action on the carrier 1.

It will be noted from an inspection of Figure 4, that at times the segment 11 is out of engagement with the pinion. During the time of such lack of engagement, the indexing arm 7 and the jack shaft 8 are held against rotation. As shown, this is accomplished by the engagement of a follower 15 on the arm 7 carried by the jack shaft 8 riding in an arcuate cam path 16 which is a slot or channel in a face cam 17 (shown detached in Figure 7) keyed to the drive shaft 12. This cam path 16 for the major portion of its length is annular, being struck about the central axis of the drive shaft, so that while the cam path 16 is in controlling relation to the follower 15 and the drive shaft 12 is turning, the jack shaft 8 is fixed against rotation.

It will be noted, however, that at one end the cam path 16 flares outwardly between a tapered end portion 18 of the outer rim 19 of the cam 17 and a portion 20. For convenience of manufacture the portion 20 is formed as a block separate from the cam 17 and secured thereto as by the screws 21. This portion of the cam path becomes active as shown in Figure 5 just as the approaching end of the segment 11 engages the pinion 10, and acts to allow the full engagement of the segment with the pinion with a consequent turning motion of the jack shaft 8, before the follower 6 reaches one of the ways 5 of the member to be indexed. Thus the indexing action does not begin until the segment is in full mesh with the pinion so that there is no stress exerted between the teeth prior to such full engagement by any load applied to the indexing arm. At the other end of the cam path 16 the inner face of the path is cut away as at 210 so that the cam follower enters the path freely. At this point the indexing has been completed so that no work stresses are imposed on the parts.

For compactness of structure desirable in a multi-spindle machine, the disc member 1 to be indexed and the cam member 17 are disposed in parallel planes. The indexing arm 7 revolves in a plane parallel to and between these parallel planes. The cam follower 6 therefore is mounted on one face of the indexing arm, and the follower 15 is mounted on the other face of the same arm.

Figures 5 and 6 show the relationships of the segment 11 and the pinion 10 at the start of the indexing motion of the jack shaft and before the actual start of the indexing action begins and shows the full meshing between the segment of the pinion in Figure 6 by the time indexing load is placed upon the indexing arm 16.

From the foregoing description it will be noted that the jack shaft is held against turning during the major portion of its idle time, but is turned positively during the entire indexing action, and it is found that this arrangement is exceedingly quiet and shock-free action is produced.

I claim:

In combination, a rotary disc to be indexed, a plurality of cam ways radiating from the indexing axis of said disc, a rotary drive shaft, a cam member mounted on said drive shaft, said rotary disc and cam member being disposed in parallel planes, a rotary jack shaft parallel to said drive shaft, an indexing arm carried by said jack shaft to revolve in a plane parallel to and between the planes of the rotary disc and cam member, a cam follower mounted on one face of said arm to engage said cam member and lock said arm during a portion of each revolution of the drive shaft, a second follower mounted on the other face of said arm to engage successively in said ways to index said disc when the jack shaft rotates, a pinion on said jack shaft, and a gear segment on said drive shaft meshing with said pinion during the portion of each revolution of the drive shaft when said cam follower is not in engagement with said cam member.

References Cited in the file of this patent

UNITED STATES PATENTS

| | | | |
|---|---|---|---|
| 123,237 | Chapman | Jan. 30, | 1872 |
| 449,334 | Roraback | Mar. 31, | 1891 |
| 1,196,328 | Braden | Aug. 29, | 1916 |
| 2,395,803 | Bruckner et al. | Mar. 5, | 1946 |

FOREIGN PATENTS

| | | | |
|---|---|---|---|
| 323,062 | France | Oct. 27, | 1902 |
| 629,796 | Germany | May 12, | 1936 |